US011341780B2

(12) United States Patent
Boggio et al.

(10) Patent No.: US 11,341,780 B2
(45) Date of Patent: May 24, 2022

(54) MAINTENANCE OF AN AIRCRAFT VIA SIMILARITY DETECTION AND MODELING

(71) Applicant: The Boeing Company, Chicago, IL (US)

(72) Inventors: John M. Boggio, Columbia, IL (US); Eric Nicks, Defiance, MO (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 16/190,521

(22) Filed: Nov. 14, 2018

(65) Prior Publication Data

US 2020/0151967 A1 May 14, 2020

(51) Int. Cl.
*G07C 5/00* (2006.01)
*G07C 5/08* (2006.01)
*G05B 23/02* (2006.01)

(52) U.S. Cl.
CPC ........... *G07C 5/006* (2013.01); *G07C 5/0808* (2013.01); *G07C 5/0816* (2013.01); *G05B 23/0283* (2013.01)

(58) Field of Classification Search
CPC ...... G07C 5/00–12; G07C 7/00; G07C 5/006; G07C 5/0808; G07C 5/0816; G05B 23/0262; G05B 23/00–0297; G05B 23/0283; B64D 2045/0085; B64F 5/00
USPC ............................ 701/31.9, 3–18, 29.1–34.4
See application file for complete search history.

(56) References Cited

U.S. PATENT DOCUMENTS 7,230,527 B2   6/2007 Basu et al.
7,577,548 B1 *  8/2009 Przytula ................ G06N 7/005
                                                  702/182
2004/0002776 A1 *  1/2004 Bickford ............ G05B 23/0275
                                                  700/30
2006/0126608 A1 *  6/2006 Pereira ................ G05B 13/042
                                                  370/360
2009/0228160 A1 *  9/2009 Eklund ................ G06F 11/008
                                                  701/3

(Continued)

FOREIGN PATENT DOCUMENTS

GB        2546250 A  *  7/2017  ........... G07C 5/0808

OTHER PUBLICATIONS

Evaluating Real-time Anomaly Detection Algorithms—the Numenta Anomaly Benchmark, (2015); Lavin et al.

*Primary Examiner* — Jeffrey C Boomer
*Assistant Examiner* — Paul Allen
(74) *Attorney, Agent, or Firm* — Womble Bond Dickinson (US) LLP

(57) ABSTRACT

An apparatus for maintenance of an aircraft is provided. The apparatus accesses flight data for a flight of the aircraft and predicts and thereby produces a predicted state of the aircraft for a next flight of the aircraft based on the flight data. The apparatus deploys a similarity detection model to determine similarities between the flight data for the flight and a training set of flight data for previous flights of the aircraft. The similarities determined by the similarity detection model are values of independent variables of a classification model. The apparatus deploys the classification model to predict and thereby produce a predicted state of the aircraft for the next flight of the aircraft based on the values of the independent variables, and generates an alert when the predicted state of the aircraft is a fault state.

18 Claims, 13 Drawing Sheets

(56) References Cited

U.S. PATENT DOCUMENTS

| | | | |
|---|---|---|---|
| 2013/0218823 A1* | 8/2013 | Ferrand | G06N 5/025 706/46 |
| 2015/0278711 A1* | 10/2015 | Angelov | G05B 23/024 706/12 |
| 2015/0324501 A1* | 11/2015 | Desell | G01C 23/00 703/2 |
| 2016/0358387 A1* | 12/2016 | Lacaille | G07C 5/008 |
| 2017/0166328 A1* | 6/2017 | Ethington | B64F 5/60 |
| 2017/0286854 A1* | 10/2017 | Ardis | G06N 5/045 |
| 2017/0352204 A1* | 12/2017 | Huet | B64D 45/00 |
| 2018/0257683 A1* | 9/2018 | Govindappa | B61L 15/0081 |
| 2018/0330557 A1* | 11/2018 | Rivera | G05B 23/0235 |
| 2019/0147411 A1* | 5/2019 | John | G06Q 10/06315 705/305 |
| 2019/0147412 A1* | 5/2019 | Chiaramonte | G06Q 10/06311 705/7.13 |

* cited by examiner

MAINTENANCE OF AN AIRCRAFT VIA SIMILARITY DETECTION AND MODELING

TECHNOLOGICAL FIELD

The present disclosure relates generally to maintenance of an aircraft, and in particular, to maintenance using of an aircraft using a similarity detection model and a classification model to determine a state of the aircraft.

BACKGROUND

Determining a state of an aircraft is important for operation and maintenance of the aircraft. For example, if the aircraft is in a fault state, maintenance may be required for the aircraft. Some existing solutions manually define and implement predictive algorithms to predict or determine a state of an aircraft, which are time-consuming, expensive, and not easily adaptable. Some other existing solutions utilize feature extraction to predict or determine a state of an aircraft, which is not flexible and may have limited effectiveness.

Therefore, it would be desirable to have a system and method that takes into account at least some of the issues discussed above, as well as other possible issues.

BRIEF SUMMARY

Example implementations of the present disclosure are directed to maintenance of an aircraft using a similarity detection model and a classification model to determine a state of the aircraft. Example implementations can embed an artificial intelligence (AI) system in an aircraft allowing the aircraft to autonomously predict its own faults and alert maintainers of impending issues. The AI system may access sensor data from the flight data recorder and/or fault data from the reporting system of the aircraft. Based on the sensor data and/or fault data, the aircraft can learn what standard and fault behaviors or conditions look like. The aircraft can use deep learning to measure the similarities between its current condition and each of the learned conditions using the similarity detection model of the AI system. The similarities can be used as inputs to the classification model of the AI system to predict if an impending fault may occur. The AI system can generate an alert if the predicted state of the aircraft is a fault state. In response to the alert, the aircraft can be indexed to a maintenance facility for performing maintenance and/or repair based on the impending fault.

Example implementations can provide multiple advantages over existing solutions. For example, the AI system onboard the aircraft uses virtually zero human effort to determine the state of an aircraft. The aircraft can learn different operating conditions by itself and recognize multiple permutations of standard and fault conditions. The AI system can start learning from the birth of the aircraft. Fault probability of a component of the aircraft can be determined by using deep learning to measure similarities between current condition of the aircraft and learned conditions. The similarities can be used to predict of the state of the aircraft in a future flight. The prediction can be adaptive to the way that the aircraft is currently flying. Each individual aircraft can set its own threshold for predicting faults. The AI system can continuously learn and adapt itself to become more flexible and accurate over time. The AI system can validate its prediction and update itself without the need of human intervention. The AI system can only monitor faults that the aircraft has already experienced to improve computing performance and minimize the computing power used to implement the system.

The present disclosure thus includes, without limitation, the following example implementations.

Some example implementations provide a method of maintenance of an aircraft, comprising: accessing flight data for a flight of the aircraft, the flight data including measurements of one or more properties from one or more sensors or avionic systems during the flight; predicting and thereby producing a predicted state of the aircraft for a next flight of the aircraft based on the flight data, including at least: deploying a similarity detection model to determine similarities between the flight data for the flight and a training set of flight data for previous flights of the aircraft, the flight data for the previous flights assigned to conditions of the aircraft that are independent variables of a classification model built to predict a state of the aircraft for the next flight, the similarities determined by the similarity detection model being values of the independent variables; and deploying the classification model to predict and thereby produce the predicted state of the aircraft for the next flight of the aircraft based on the values of the independent variables; and, generating an alert when the predicted state of the aircraft is a fault state.

In some example implementations of the method of any preceding example implementation, or any combination of preceding example implementations, the method further comprises monitoring a reporting system of the aircraft to determine if the aircraft reported a fault during the flight.

In some example implementations of the method of any preceding example implementation, or any combination of preceding example implementations, predicting and thereby producing the predicted state of the aircraft for the next flight includes predicting and thereby producing the predicted state of the aircraft for the next flight only when the aircraft did not report the fault during the flight.

In some example implementations of the method of any preceding example implementation, or any combination of preceding example implementations, the method further comprises: deploying the similarity detection model to determine if the flight data for the flight has a threshold similarity with the flight data for any of the previous flights that are assigned to the conditions of the aircraft; and when the flight data for the flight does not have the threshold similarity with the flight data for any of the previous flights, assigning the flight data for the flight to a new condition of the aircraft indicating the fault state; and adding the flight data for the flight assigned to the new condition to the training set for the similarity detection model.

In some example implementations of the method of any preceding example implementation, or any combination of preceding example implementations, the method further comprises: deploying the similarity detection model to determine if the flight data for the flight has a threshold similarity with the flight data for any of the previous flights that are assigned to the conditions of the aircraft; and when the flight data for the flight has the threshold similarity with the flight data for at least one of the previous flights assigned to a condition of the conditions indicating the fault state, assigning the flight data for the flight to the condition; and adding the flight data for the flight assigned to the condition to the training set for the similarity detection model.

In some example implementations of the method of any preceding example implementation, or any combination of preceding example implementations, the next flight is of a plurality of flights after the flight, and the method further comprises monitoring the flight data for the plurality of flights to determine if the aircraft reported the fault during the plurality of flights to verify the predicted state.

In some example implementations of the method of any preceding example implementation, or any combination of preceding example implementations, deploying the similarity detection model includes deploying the similarity detection model to at least: plot the flight data for the flight to produce one or more first images, and plot the training set of flight data to produce one or more second images; and compare the one or more first images with the one or more second images to determine the similarities between the flight data for the flight and the training set of flight data for the previous flights.

Some example implementations provide an apparatus for determining a state of an aircraft. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for determining a state of an aircraft. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
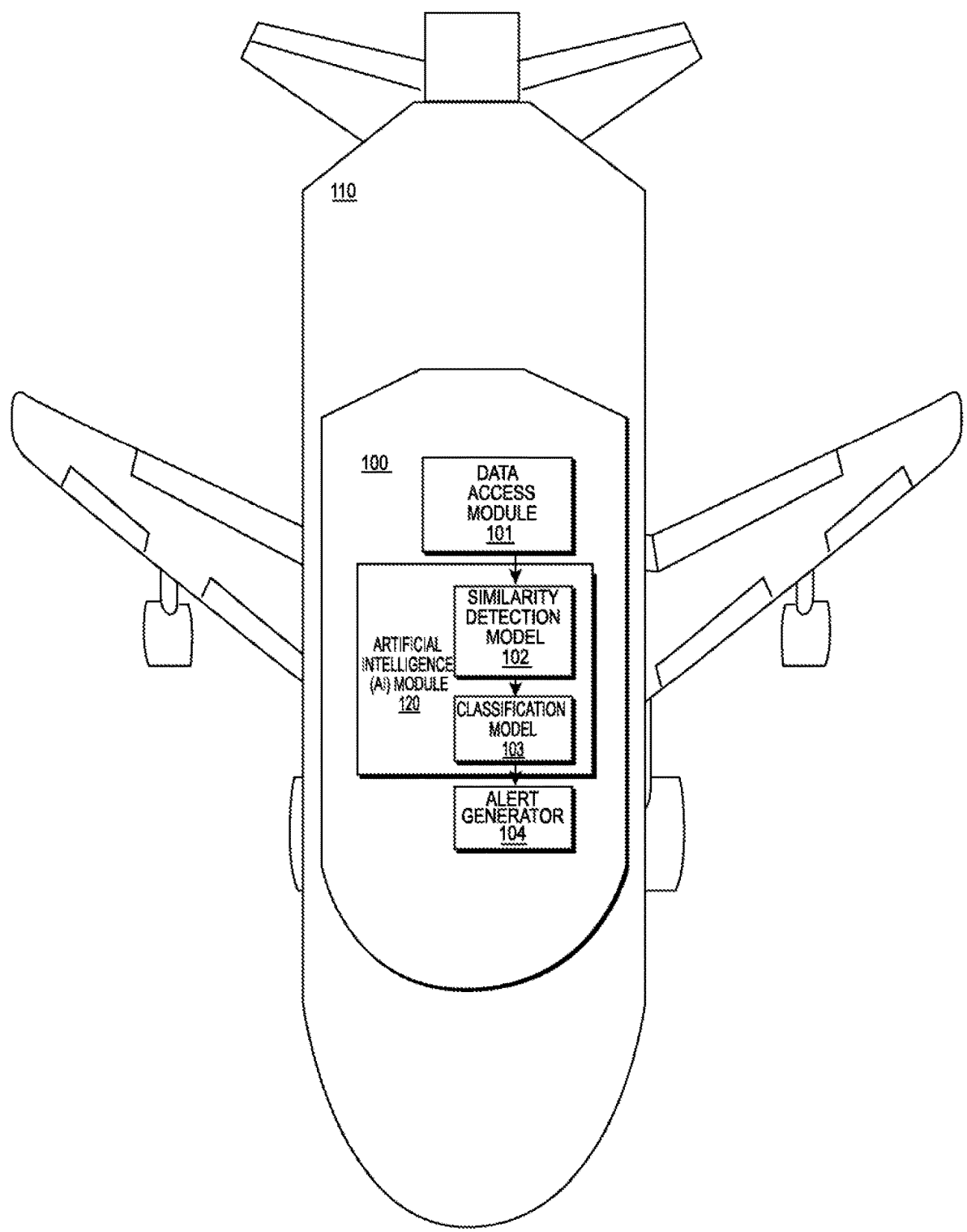
FIG. 1 illustrates a system for determining a state of an aircraft, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to maintenance of an aircraft, and in particular, to maintenance of an aircraft using a similarity detection model and a classification model to determine a state of the aircraft. The system is primarily described in the context of an aircraft, but it should be understood that the system is equally applicable to any of a number of types of vehicles such as any of a number of different types of manned or unmanned land vehicles, aircraft, spacecraft, watercraft or the like.

FIG. 1 illustrates a system 100 for maintenance of an aircraft 110, according to example implementations of the present disclosure. As shown, the system can be onboard the aircraft, although in other examples the system can be located remote from the aircraft. In some examples, as described in greater detail with reference to FIG. 10, the system may be implemented by an apparatus for maintenance of the aircraft.

The system 100 includes any of a number of different subsystems (each an individual system) for performing one or more functions or operations. As shown, in some examples, the system includes one or more of each of a data access module 101, an artificial intelligence (AI) module 120 including a similarity detection model 102 and a classification model 103, and an alert generator 104. The subsystems may be co-located or directly coupled to one another, or in some examples, various ones of the subsystems may communicate with one another across one or more computer networks. Further, although shown as part of the system, it should be understood that any one or more of the data access module, AI module, similarity detection model, classification model, and alert generator may function or operate as a separate system without regard to any of the other subsystems. It should also be understood that the system may include one or more additional or alternative subsystems than those shown in FIG. 1.

In some examples, the data access module 101 is configured to access flight data for a flight of the aircraft 110. The flight data includes measurements of one or more properties from one or more sensors or avionic systems during the flight. Examples of the properties may include the air pressure and/or the condenser inlet temperature. The flight data can be stored in a database of a computer system of the aircraft such that the data access module can access the flight data. The flight data can be from the flight data recorder and/or from the reporting system of the aircraft. The flight can be a current flight of the aircraft.

In some examples, the AI module 120 is configured to predict and thereby produce a predicted state of the aircraft 110 for a next flight of the aircraft based on the flight data accessed by the data access module 101. The next flight can be a future flight after the current flight. In these examples, the AI module is configured to deploy the similarity detection model 102 to determine similarities between the flight data for the flight and a training set of flight data for previous flights of the aircraft. The similarity detection model may include a neural network or an auto-encoder. The previous flights can be flights before the current flight. The training set of flight data can be stored in a database such that the data access module can access the training set. The data access module can provide the flight data for the flight and the training set of flight data to the similarity detection model. In these examples, the flight data for the previous flights are assigned to conditions of the aircraft. The conditions are independent variables of the classification model 103, which is built to predict the state of the aircraft for the next flight. The similarities determined by the similarity detection model are values of the independent variables. The training data set may also include the state (e.g., standard or fault) of the previous flights.

To determine the similarities between the flight data for the flight, and the training set of flight data for previous flights of the aircraft 110, the AI module 120 is in some examples configured to deploy the similarity detection model 102 to plot the flight data for the flight to produce one or more first images, and plot the training set of flight data to produce one or more second images. The AI module is also configured to deploy the similarity detection model to compare the one or more first images with the one or more second images to determine the similarities between the flight data for the flight and the training set of flight data for the previous flights.

After the similarities are determined, in some examples, the AI module 120 is configured to deploy the classification model 103 to predict and thereby produce the predicted state of the aircraft 110 for the next flight of the aircraft based on the values of the independent variables (i.e., the similarities). The alert generator 104 is configured to generate an alert when the predicted state of the aircraft is a fault state. In response to the alert, the pilot of the aircraft and/or the control center on the ground may control the operation of the aircraft, e.g., landing of the aircraft, to avoid the occurrence of the fault state. In another example, the alert may specify the part or component that has a probability over a threshold to experience a fault, as well as an estimate of remaining useful life of the component. In response to the alert, the aircraft can be indexed to a maintenance facility for performing maintenance and/or repair. In this example, engineers or technicians at the maintenance facility can repair, update or replace the one or more parts or components related to or causing the fault state.

In some examples, the next flight is of a plurality of future flights after the current flight. After the predicted state of the aircraft 110 is produced by the classification model 103, the data access module 101 of the system 100 is configured to monitor the flight data for the plurality of flights to determine if the aircraft reported the fault during the plurality of flights to verify the predicted state.

In some examples, the data access module 101 of the system 100 is configured to monitor the reporting system of the aircraft to determine if the aircraft 110 reported a fault during the flight. In some examples, the classification model 103 is configured to predict and thereby produce the predicted state of the aircraft for the next flight only when the aircraft did not report the fault during the flight.

When the aircraft 110 reported the fault during the flight, in some examples, the AI module 120 is configured to deploy the similarity detection model 102 to determine if the flight data for the fault flight has a threshold similarity with the flight data for any of the previous fault flights that are assigned to the conditions of the aircraft. When the flight data for the flight does not have the threshold similarity with the flight data for any of the previous fault flights, the similarity detection model is configured to assign the flight data for the flight to a new condition of the aircraft indicating the fault state. The similarity detection model is also configured to add the flight data for the flight assigned to the new condition to the training set for the similarity detection model.

In some other examples, when the aircraft 110 reported the fault during the flight, the AI module 120 is configured to deploy the similarity detection model 102 to determine if the flight data for the flight has a threshold similarity with the flight data for any of the previous fault flights that are assigned to the conditions of the aircraft. When the flight data for the fault flight has the threshold similarity with the flight data for at least one of the previous fault flights assigned to a condition of the conditions indicating the fault state, the similarity detection model is configured to assign the flight data for the flight to the condition. The similarity detection model is also configured to add the flight data for the flight assigned to the condition to the training set for the similarity detection model. The reporting system of the aircraft may report the fault. And the data access module 101 may access the reporting system to get data of the fault.

Figure 2:
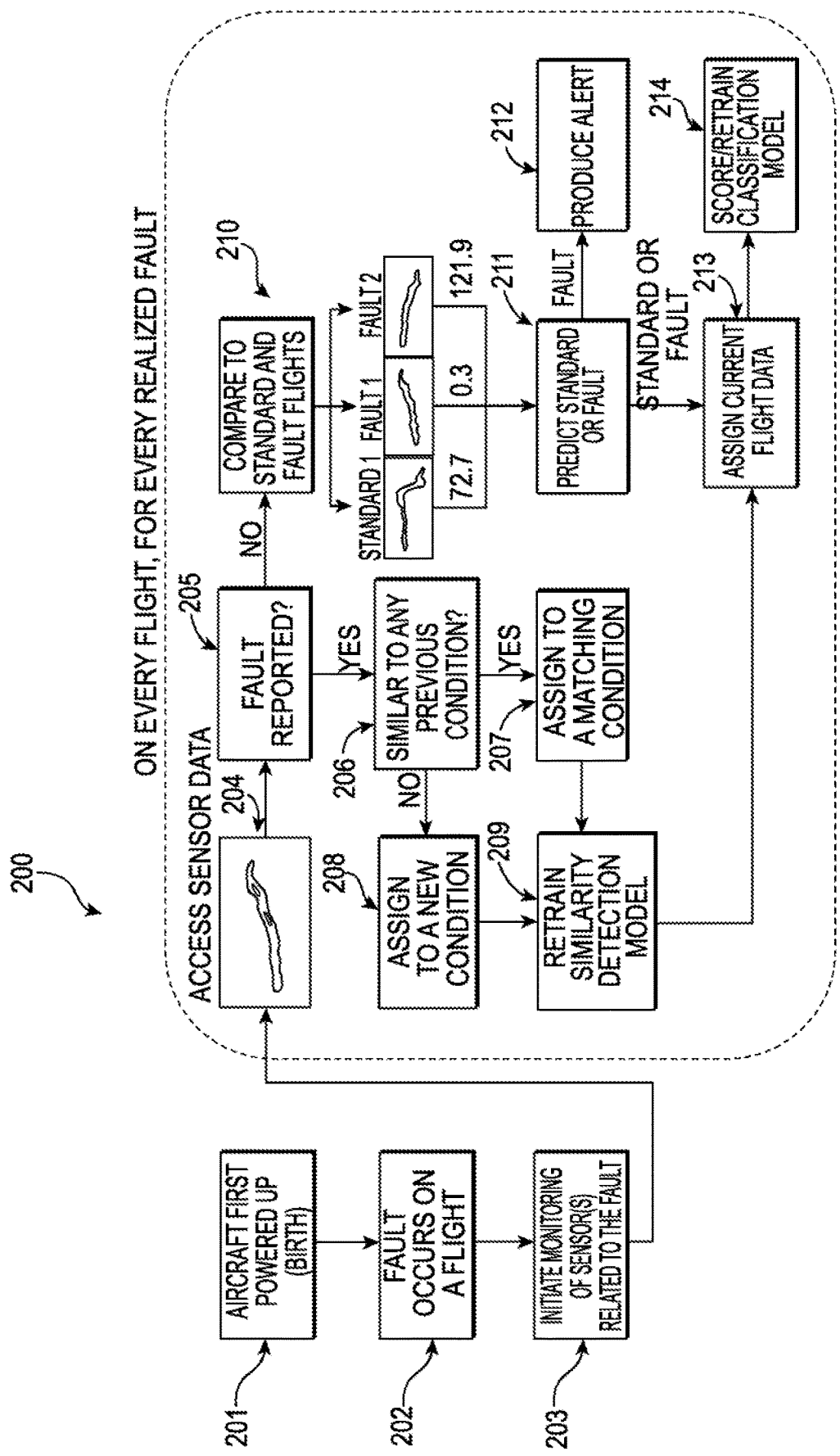
FIG. 2 illustrates a flowchart for determining a state of the aircraft, according to example implementations of the present disclosure.

FIG. 2 illustrates a flowchart 200 for determining a state of an aircraft 110, according to example implementations of the present disclosure. As shown, at block 201, the aircraft 110 is first powered up. At block 202, a fault of a component of the aircraft occurred. For example, after the first five flights, the aircraft experienced a fault to its low limit valve (LLV) in the sixth flight. At block 203, the system 100 can initiate monitoring of sensor(s) related to the fault. For example, the data access module 101 can utilize a "fault-to-sensor" map stored in a database to identify that the LLV fault is related to a condenser inlet temperature (CIT) sensor and start to monitor data of the CIT sensor. The data access module can start to monitor data of the CIT sensor for every flight after the sixth flight. The data access module can also monitor data for every realized fault.

For a current flight, at block 204, the data access module 101 can access sensor data from the sensor related to the fault. At block 205, the data access module can monitor the reporting system of the aircraft to determine if the aircraft reported the fault during the current flight. When the aircraft reported the fault during the current flight, the flow chart proceeds from block 205 to block 206. At block 206, the similarity detection model 102 can determine if the condition of the current flight is similar to any previous fault condition. For example, the similarity detection model can determine similarities between the flight data for the current flight and a training set of flight data for previous flights of the aircraft. The flight data for the previous flights can be assigned to different conditions of the aircraft.

If the flight data for the current flight has a threshold similarity with at least one of the previous flights assigned to a condition indicating the fault or a fault state, the flow chart proceeds from block 206 to block 207. At block 207, the similarity detection model 102 can assign the flight data for the current flight to the condition and add the flight data for the current flight to the training set. The similarity detection model can be retrained based on the updated training set at block 209.

On the other hand, if the flight data for the current flight does not have a threshold similarity with the flight data for any of the previous fault flights, the flow chart proceeds from block 206 to block 208. At block 208, the similarity detection model 102 can assign the flight data for the flight to a new condition of the aircraft 110 indicating the fault or a fault state. The similarity detection model can also add the flight data for the current flight assigned to the new condition to the training set. The similarity detection model can be retrained based on the updated training set at block 209.

When the aircraft 110 did not report the fault during the current flight, the flow chart proceeds from block 205 to block 210. At block 210, the similarity detection model 102 can compare the flight data for the current flight to the training set of flight data for previous standard and/or fault flights of the aircraft. The comparisons can determine similarities between the flight data for the current flight and the training set of flight data, similarly as at block 206. For example, as shown, the similarities can have different values or scores such as 72.7, 0.3 or 121.9. A smaller score may indicate a higher similarity. In this example, the current flight data is most similar to previous flight data indicating a "Fault 1" condition because the score is 0.3. A threshold similarity can be used to determine the similarities between the flight data for the current flight and the training set of flight data. The threshold similarity can be a predetermined score such as 6.0.

At block 211, the classification model 103 can predict whether the aircraft 110 is standard or fault in a next or a future flight based on the similarities determined at block 210. The alert generator 104 can generate an alert when the predicted state of the aircraft is a fault state, as shown at block 212. Based on the prediction (standard or fault), at block 213, the data access module 101 can verify whether the prediction is correct or not based on whether the fault actually occurs in a plurality of future flights. Also, at block 213, based on the verification, the similarity detection model 102 can assign the flight data for the current flight to a condition of the aircraft. After the flight data for the current flight is assigned to a condition and added to the training set, the classification model can be scored and retrained based on the updated training set at block 214.

Figure 3:
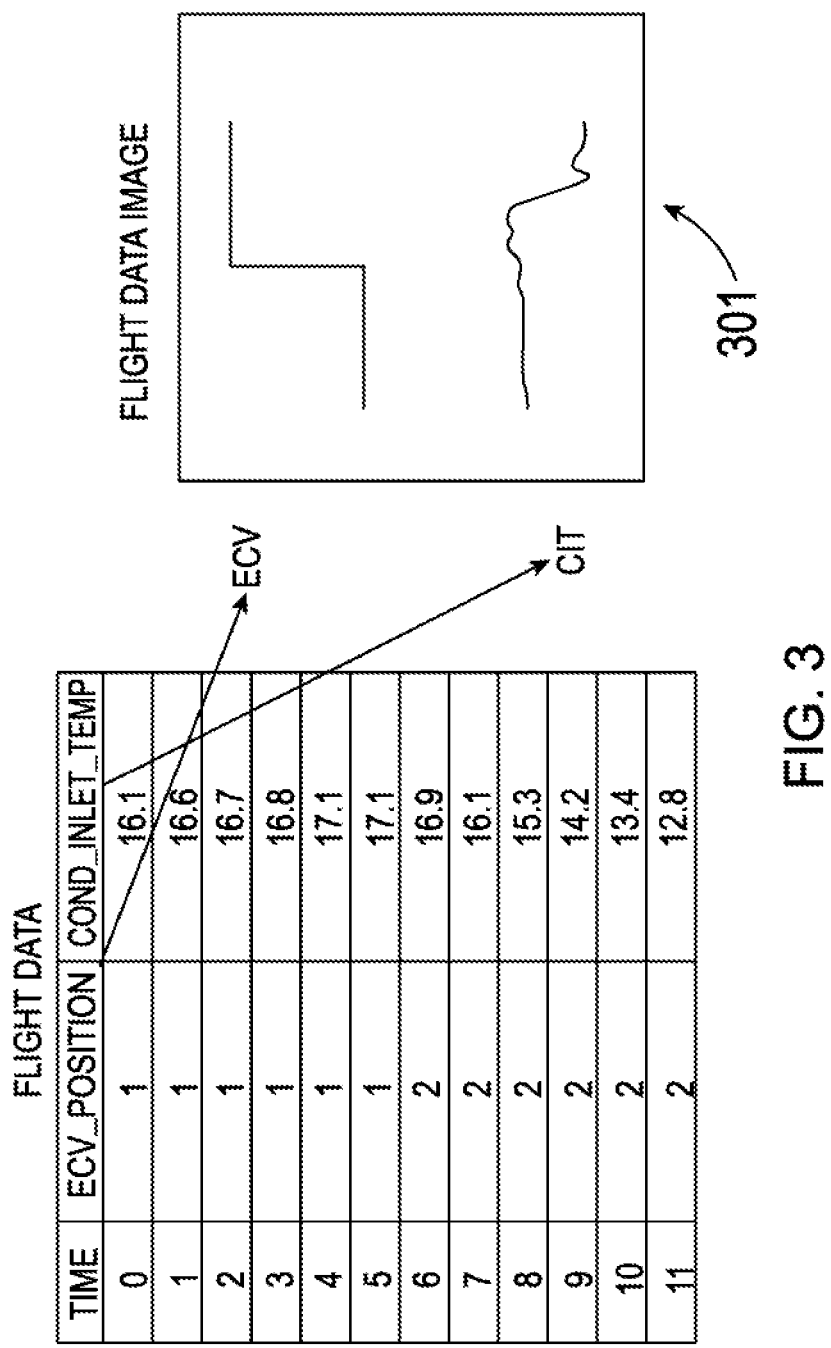
FIG. 3 illustrates images of flight data, according to example implementations of the present disclosure.

In one example, the flight data can be converted into images for comparison. FIG. 3 illustrates images of flight data, according to example implementations of the present disclosure. As shown, for each flight, the similarity detection model 102 can plot the flight data at different points of time to produce one or more images. For example, for a flight, the similarity detection model can plot values of the economy cooling valve (ECV) position and the CIT and combine the values into one image 301.

Figure 4A:
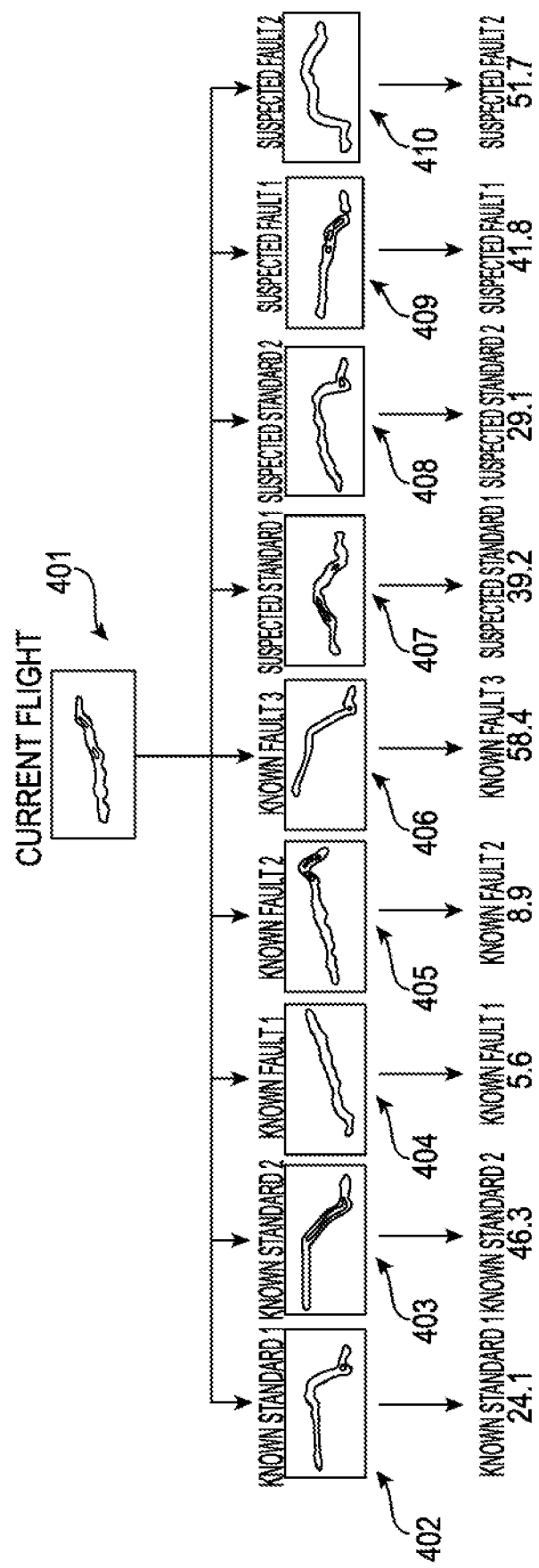
FIGS. 4A and 4B illustrate similarities between flight data, according to example implementations of the present disclosure.
Figure 4B:
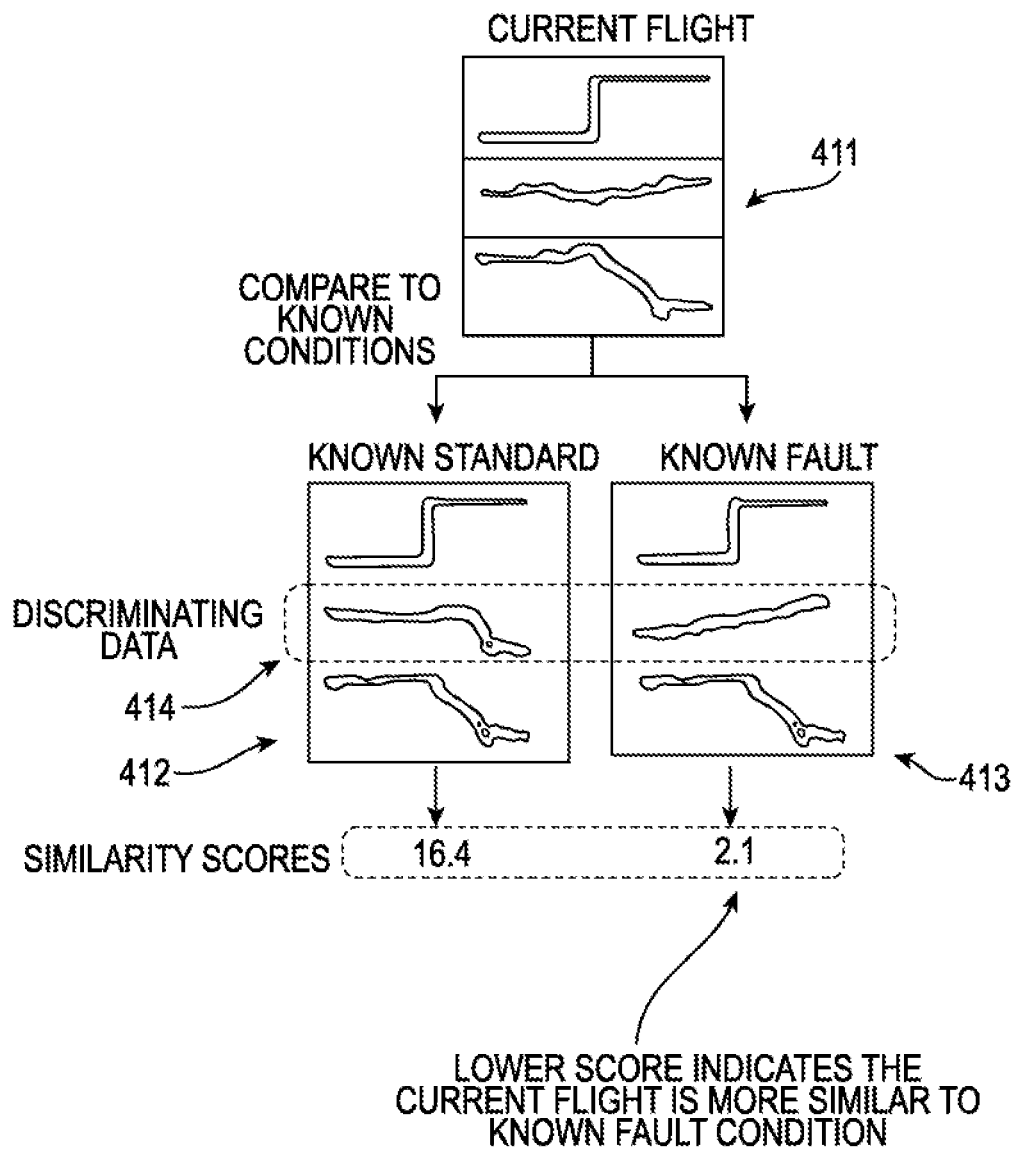

After the flight data are converted into images, the similarity detection model 102 can determine similarities between the flight data for the current flight and a training set of flight data for previous flights of the aircraft 110 by comparing the images. FIGS. 4A and 4B illustrate similarities between flight data for a current flight and a training set of flight data for previous flights of the aircraft, according to example implementations of the present disclosure. As shown in FIG. 4A, image 401 can be the image of flight data for the current flight. Images 402, 403, 404, 405, 406, 407, 408, 409 and 410 can be images of the training set of flight data for previous flights of the aircraft. The images 401-410 can be generated similarly as described above with reference to FIG. 3. The images in FIG. 4A may be generated based on flight data from a single sensor related to a fault.

In one example, each of the images 402-410 can be assigned to a condition of the aircraft. The conditions of the aircraft 110 can be one of four categories: known standard, known fault, suspected standard and suspected fault. The category of known standard can indicate that the aircraft experienced no fault during a predetermined number of future flights such as ten future flights. The category of know fault can indicate that the aircraft experienced a fault such as the LLV fault in the current flight. The category of suspected standard can indicate that the aircraft is within a predetermined number of flights such as within ten flights of a future flight having the fault, but the condition resembles a known standard condition. The category of suspected fault can indicate that the aircraft is within a predetermined number of flights such as within ten flights of a future flight having the fault, and the condition does not resemble a known standard condition.

In one example, a trained autoencoder model is trained for each learned condition (such as Known Standard 1, Known Standard 2, Suspected Standard 1, etc.,). Each of these autoencoder models can be trained by taking every instance of a particular learned condition (e.g., "Known Standard 1"). During the model training process, the autoencoder model can learn how to compress the images and rebuild them in a manner that most resembles their original state. In one example, to calculate the similarity of the current flight to a previously learned condition, the image generated from the flight data for the current flight can be provided to the autoencoder model associated with the learned condition. The autoencoder model can compress the image for the current flight, and then rebuild the image. The autoencoder model can compare the pixel values of the rebuilt image to the pixel values of the original image. The sum of the difference between those pixel values may represent the calculated similarity of the current flight to the learned condition. This process may be implemented for each of the conditions that the aircraft has learned.

In one example, as shown in FIG. 4A, the similarity detection model 102 can compare the image 401 with each of the images 402-410 to determine the similarities between the flight data for the current flight and the training set of flight data for the previous flights, as described above. A smaller score may indicate a higher similarity. In this example, the image 401 is most similar to the image 404 because the score is 5.6, which is the smallest among all the scores. This may indicate that the condition of the current flight is most similar to a known fault condition which is referred to as "Known Fault 1." The process to determine similarities as described with reference to FIG. 4A can be implemented at blocks 206 and 210 in FIG. 2.

There may be multiple sensors related to a particular fault. FIG. 4B illustrates images generated based on flight data from multiple sensors related to a fault. As shown, image 411 can be the image of flight data for the current flight. Image 411 can be generated based on three sensors related to the fault, such as three CIT sensors related to the LLV fault. Images 412-413 can be images of the training set of flight data for previous flights of the aircraft. Similarly, images 412 and 413 can be generated based on the three sensors related to the fault. When the similarity detection model 102 compares image 411 with images 412-413 to determine similarities, the similarities may be determined based on discriminating data 414 in images 412-413. The discriminating data can be generated by one or some of the three sensors. As shown, the similarity detection model can determine that image 411 is more similar to image 413 using the discriminating data.

Figure 5A:
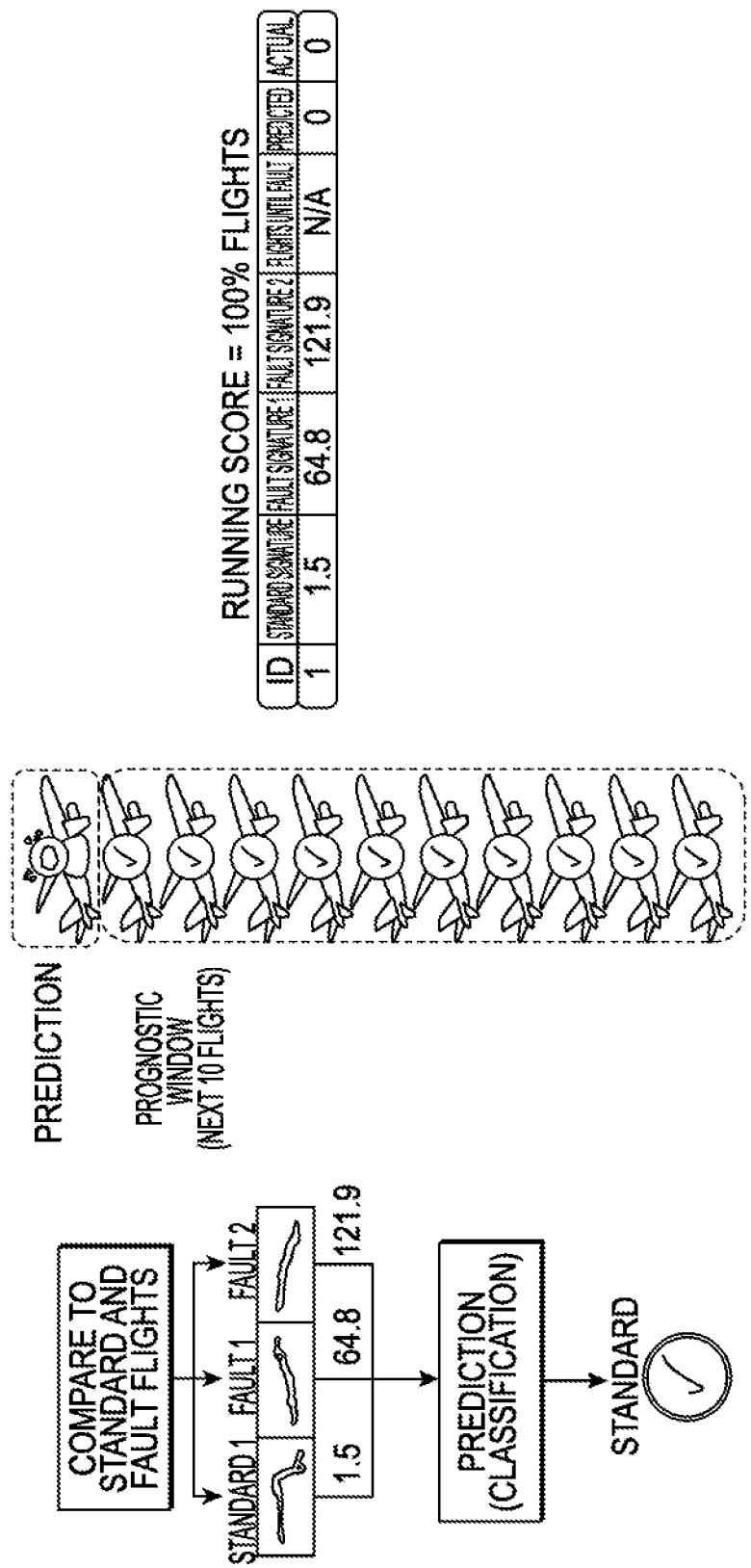
FIGS. 5A, 5B and 5C illustrate verification of a prediction of the state of the aircraft, according to example implementations of the present disclosure.
Figure 5B:
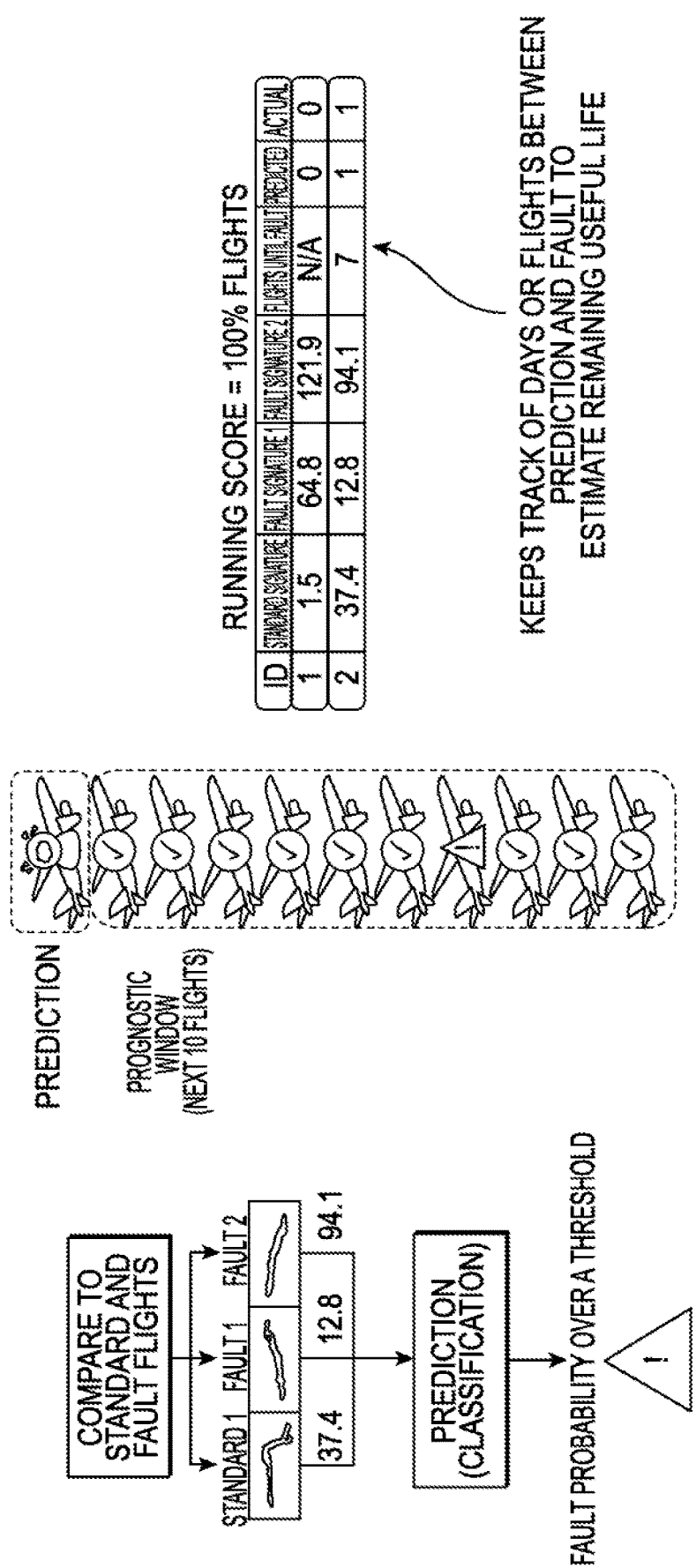
Figure 5C:
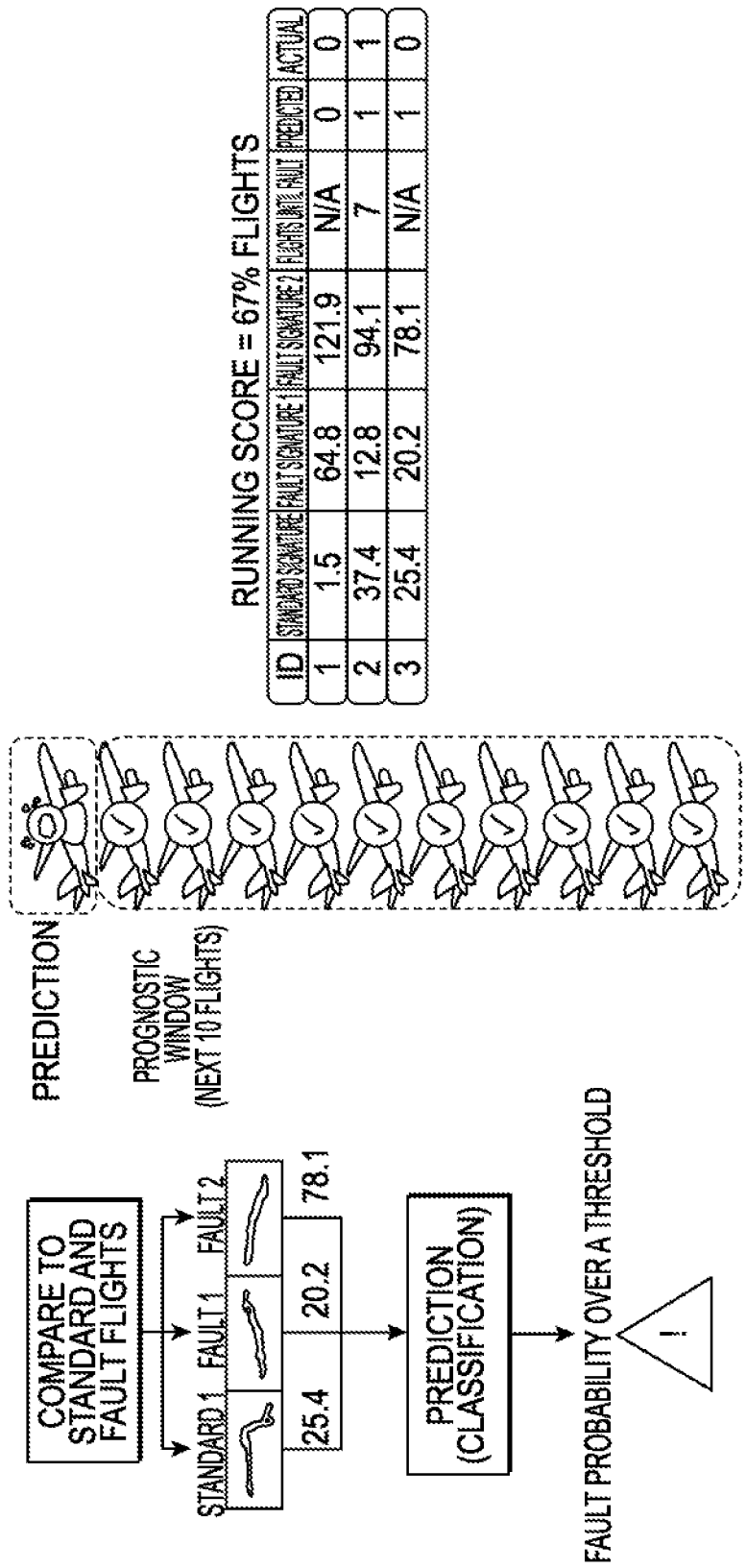

As described above with reference to FIG. 2, at block 211, the classification model 103 can predict whether the aircraft 110 is in a standard state or a fault state in a next or future flight based on the similarities determined at block 210. Based on the prediction (standard or fault), at block 213, the data access module 101 can verify whether the prediction is correct or not based on whether the fault actually occurs in a plurality of future flights. FIGS. 5A, 5B and 5C illustrate verification of a prediction of the state of the aircraft 110, according to example implementations of the present disclosure.

In one example, as shown in FIG. 5A, the classification model 103 can predict that the aircraft 110 is likely to be in a standard state (indicated by 0) in a next flight among a predetermined number of future flights such as ten future flights. And the data access module 101 can verify that there is no fault occurred during the next ten flights, which indicates that the prediction is correct. For example, the data access module can access the reporting system of the aircraft and determine that no fault is reported. Thus the running score of the classification model is 100%.

In another example, as shown in FIG. 5B, the classification model 103 can predict that the aircraft 110 has a probability over a threshold to be in a fault state (indicated by 1) in a next flight among the next ten flights. And the data access module 101 can verify that a fault indeed occurred in the $7^{th}$ flight during the next ten flights, which indicates that the prediction is correct. The classification model can track the days or flights between the current flight and the faulted flight to estimate remaining useful life of the faulted component.

In a further example, as shown in FIG. 5C, the classification model 103 can predict that the aircraft 110 has a probability over a threshold to be in a fault state (indicated by 1) in a next flight among the next ten flights. And the data access module 101 can verify that there is no fault occurred during the next ten flights, which indicates that the prediction is incorrect, i.e., the correct predicted state should be a standard state. The predictions in FIGS. 5A-5C can be made in three consecutive flights. Thus the running score of the classification model can be 67% (two correct predictions among the three predictions). The running score can be updated at block 214 in FIG. 2.

Figure 6:
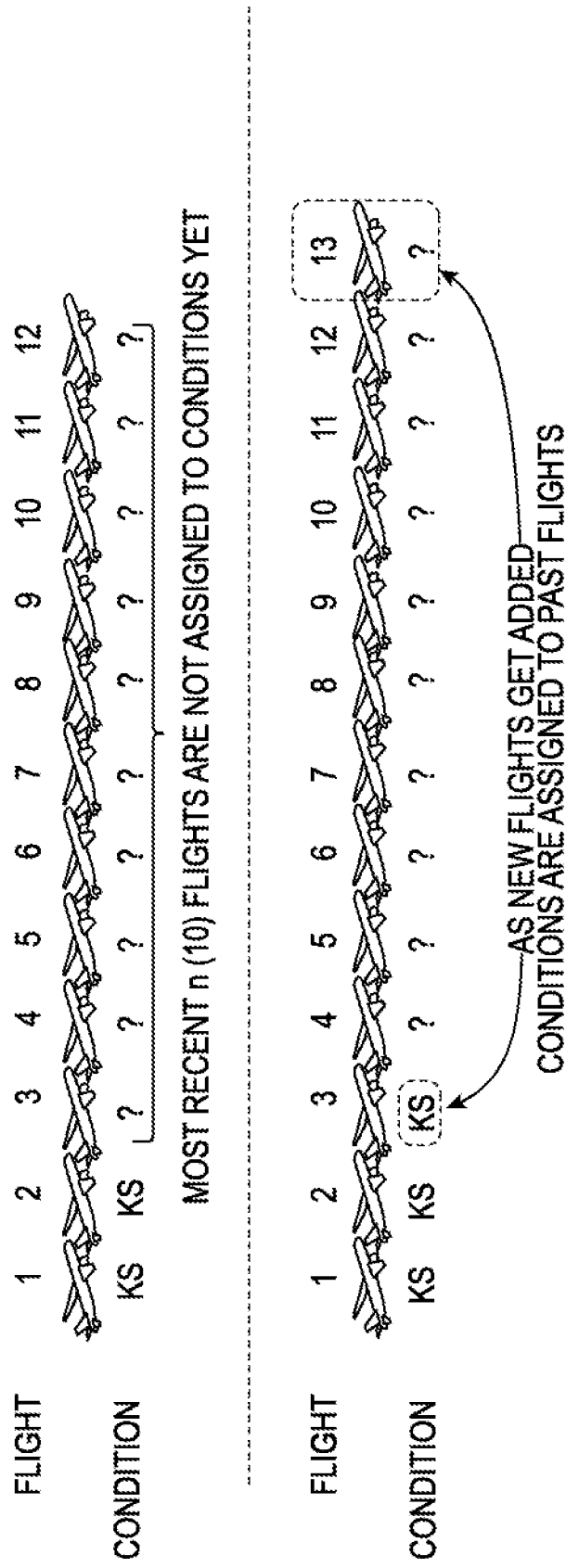
FIG. 6 illustrates a queue of assigning flight data of a flight to a condition of the aircraft, according to example implementations of the present disclosure.

As described above with reference to FIG. 2, at block 213, based on the verification, the similarity detection model 102 can assign the flight data for the current flight to a condition of the aircraft 110. FIG. 6 illustrates a queue of assigning the flight data of a flight to a condition of the aircraft, according to example implementations of the present disclosure. As shown, if the current flight is flight 2 and a prediction is made in flight 2, the data access module 101 can verify if the prediction made in flight 2 is correct or not based on N (e.g., ten) future flights 3-12 as described above. After the prediction is verified, in flight 12, the similarity detection model can assign the flight data for flight 2 to a condition such as a known standard (KH) condition. And the flight data for flights 3-12 are not assigned to any condition yet. Similarly, when there is a new flight 13, the similarity detection model can assign the flight data for flight 3 to a condition such as a known standard (KS) condition.

Figure 7:
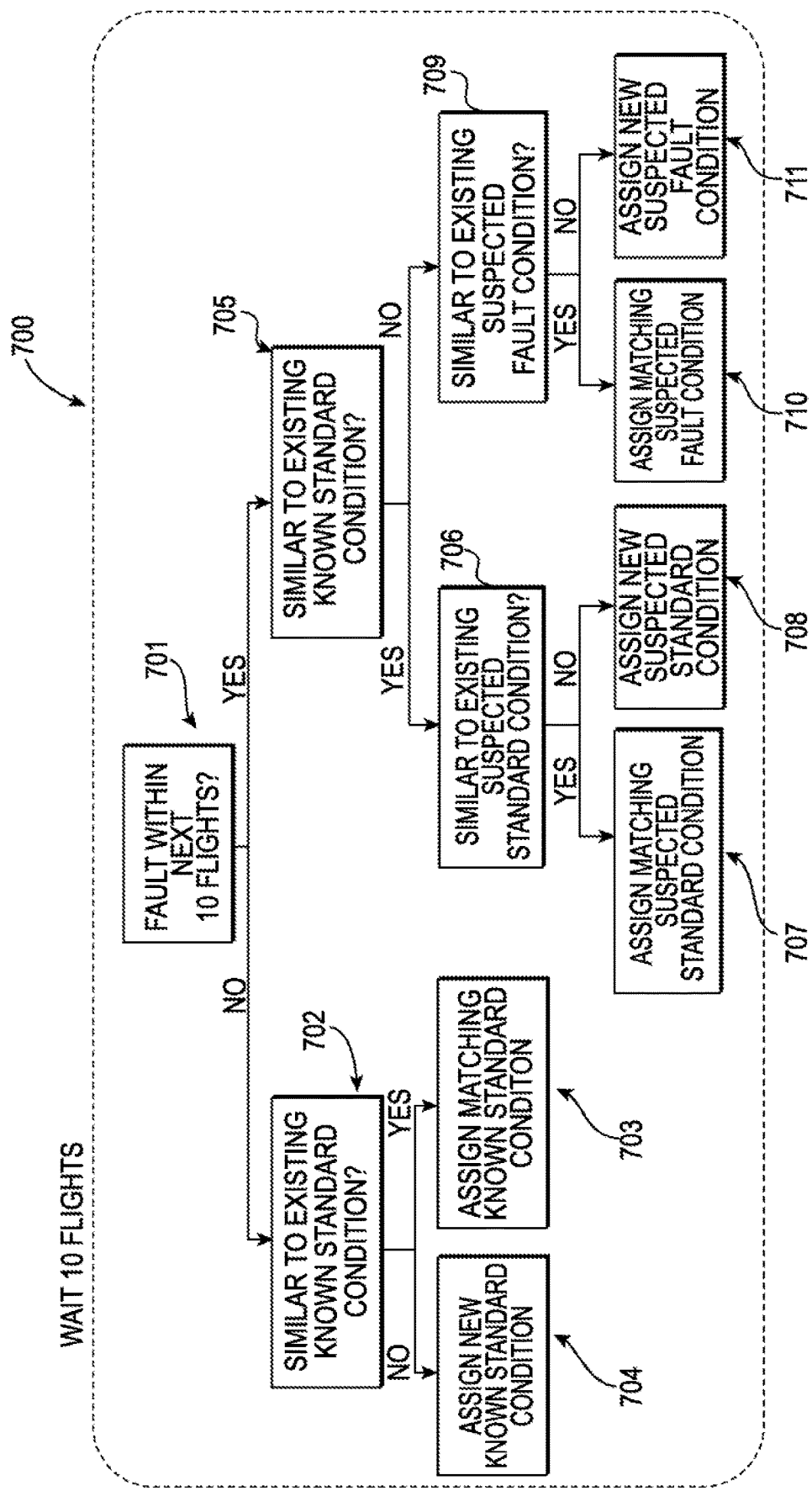
FIG. 7 illustrates a flowchart of assigning the flight data of a flight to a condition of the aircraft, according to example implementations of the present disclosure.

FIG. 7 illustrates a flowchart 700 of assigning the flight data of a flight to a condition of the aircraft, according to example implementations of the present disclosure. The flowchart can be implemented at block 213 in FIG. 2. As shown, the process in the flowchart can be implemented after the prediction is verified, as described above. For example, if the prediction is made in a flight such as flight 2 in FIG. 6, the process in the flowchart can be implemented after a predetermined number (e.g., ten) of flights such as in flight 12 in FIG. 6.

In one example, at block 701, the data access module 101 can monitor the flight data for the next ten flights to determine if the aircraft 110, or more specifically the reporting system of the aircraft, reported a fault during the next ten flights. If there is no fault reported during the next ten flights, the flowchart proceeds from block 701 to block 702. At block 702, the similarity detection model 102 can determine if the condition of the flight (the flight that the prediction was made such as flight 2 in FIG. 6) is similar to any existing known standard condition. If so, the similarity detection model can assign the flight data for the flight to the matching or similar known standard condition of the aircraft, as shown at block 703. The similarity detection model can add the flight data for the flight assigned to the matching known standard condition to the training set. If not, the similarity detection model can assign the flight data for the flight to a new known standard condition of the aircraft, as shown at block 704. The similarity detection model can also add the flight data for the flight assigned to the new known standard condition to the training set.

On the other hand, if at block 701, the data access module 101 determines that there is a fault reported during the next ten flights, the flowchart proceeds from block 701 to block 705. At block 705, the similarity detection model 102 can determine if the condition of the flight (the flight that the prediction was made) is similar to any existing known standard condition. If so, the flowchart proceeds from block 705 to block 706. At block 706, the similarity detection model 102 can determine if the condition of the flight is similar to any existing suspected standard condition. If so, the similarity detection model can assign the flight data for the flight to the matching or similar existing suspected standard condition of the aircraft, as shown at block 707. If not, the similarity detection model can assign the flight data for the flight to a new suspected standard condition of the aircraft, as shown at block 708. The similarity detection model can also add the flight data for the flight condition to the training set as described above.

If at block 705, the similarity detection model 102 determines that condition of the flight is not similar to any existing known standard condition, the flowchart proceeds from block 705 to block 709. At block 709, the similarity detection model 102 can determine if the condition of the flight is similar to any existing suspected fault condition. If so, the similarity detection model can assign the flight data for the flight to the matching or similar existing suspected fault condition of the aircraft, as shown at block 710. If not, the similarity detection model can assign the flight data for the flight to a new suspected fault condition of the aircraft, as shown at block 711. The similarity detection model can also add the flight data for the flight condition to the training set as described above.

Figure 8:
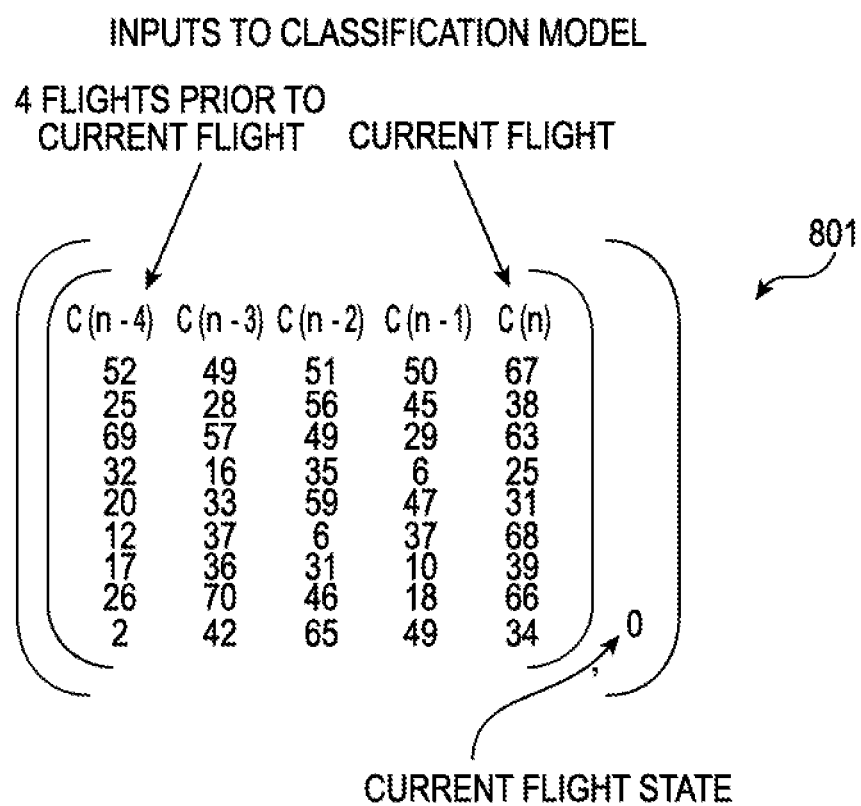
FIG. 8 illustrates independent variables of a classification model, according to various example implementations.

FIG. 8 illustrates independent variables of the classification model 103, according to various example implementations. As shown, 801 illustrates the inputs to the classification model. The inputs 801 can include similarities between the flight data for one or more flights and the training set of flight data. For example, the inputs 801 can include C(n) which includes scores of similarities (e.g., 67, 38 . . . 66, 44) between the flight data for the current flight and each of the existing conditions. The inputs 801 can also include C(n−1), C(n−2), C(n−3) and C(n−4) which include similarities between the flight data for the flights prior to the current flight and each of the existing conditions. The inputs 801 can also include the state of the current flight (e.g., fault state=1 and standard state=0).

In one example, the inputs 801 can include existing conditions of the aircraft 110 as independent variables to the classification model 103. And the similarities between the flight data and the existing conditions can be values of the independent variables. The classification model can be a long short-term memory (LSTM) network. The classification model can read the inputs and apply different weights to different similarities in the inputs to predict whether a next flight will be standard or fault.

Figure 9:
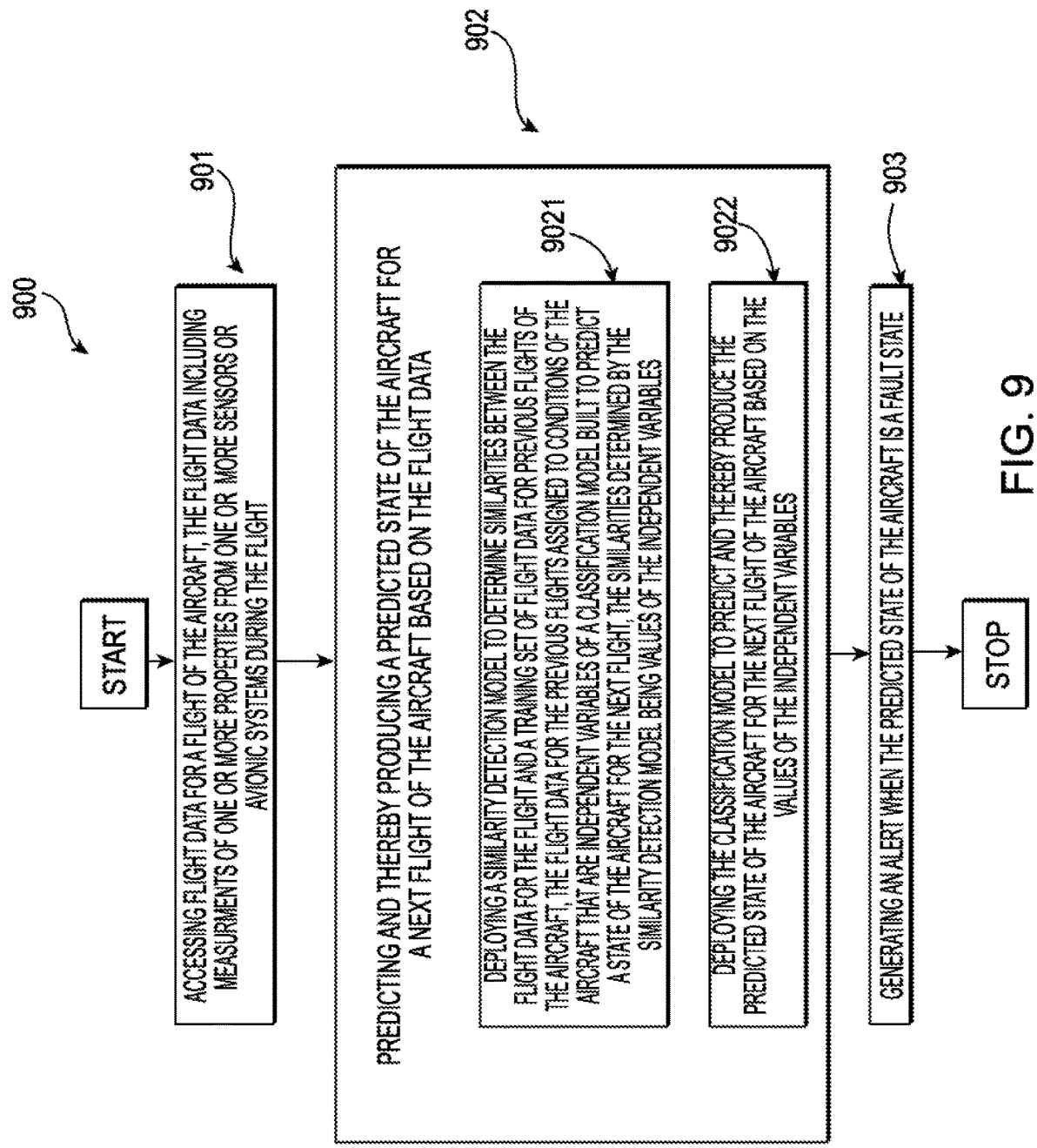
FIG. 9 is a flowchart illustrating various operations in a method of determining a state of an aircraft, according to various example implementations.

FIG. 9 is a flowchart illustrating various operations in a method 900 of determining a state of an aircraft 110, according to various example implementations. As shown at block 901, the method includes accessing flight data for a flight of the aircraft. The flight data includes measurements of one or more properties from one or more sensors or avionic systems during the flight.

At block 902, the method includes predicting and thereby producing a predicted state of the aircraft 110 for a next flight of the aircraft based on the flight data. Block 902 includes sub-blocks 9021 and 9022. At block 9021, the method includes deploying a similarity detection model 102 to determine similarities between the flight data for the flight and a training set of flight data for previous flights of the aircraft. The flight data for the previous flights are assigned to conditions of the aircraft. The conditions are independent variables of a classification model 103 built to predict the state of the aircraft for the next flight. The similarities determined by the similarity detection model are values of the independent variables. At block 9022, the method includes deploying the classification model to predict and thereby produce the predicted state of the aircraft for the next flight of the aircraft based on the values of the independent variables. At block 903, the method includes generating an alert when the predicted state of the aircraft is a fault state. The alert may specify the part or component that has a probability over a threshold to experience a fault, as well as an estimate of remaining useful life of the component. In response to the alert, the aircraft can be indexed to a maintenance facility for performing maintenance and/or repair. In this example, engineers or technicians at the maintenance facility can repair, update or replace the one or more parts or components related to or causing the fault state.

According to example implementations of the present disclosure, the system 100 and its subsystems including the data access module 101, similarity detection model 102, and classification model 103 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 10:
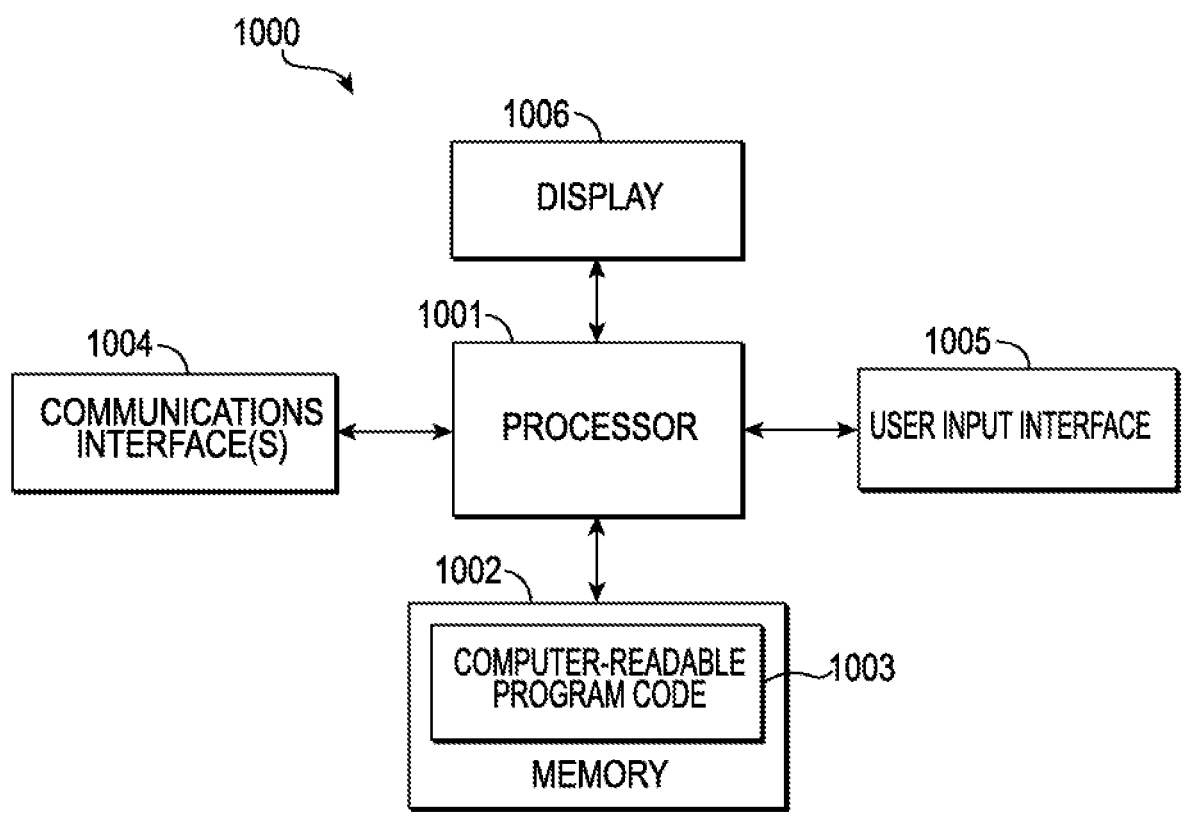
FIG. 10 illustrates an apparatus according to some example implementations.

FIG. 10 illustrates an apparatus 1000 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 1001 (e.g., processing circuitry) connected to a memory 1002 (e.g., storage device). In some examples, the apparatus 1000 implements the system 100.

The processor 1001 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1002 (of the same or another apparatus).

The processor 1001 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 1002 is generally any piece of computer hardware that is capable of storing information such as, for example, data, computer programs (e.g., computer-readable program code 1003) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1002, the processor 1001 may also be connected to one or more interfaces for displaying, transmitting and/or receiving information. The interfaces may include a communications interface 1004 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1006 and/or one or more user input interfaces 1005 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1000 may include a processor 1001 and a computer-readable storage medium or memory 1002 coupled to the processor, where the processor is configured to execute computer-readable program code 1003 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for maintenance of an aircraft, the apparatus comprising a processor and a memory storing executable instructions that, in response to execution by the processor, cause the apparatus to at least:
   access flight data for a flight of the aircraft, the flight data including measurements of one or more properties from one or more sensors or avionic systems during the flight;
   predict and thereby produce a predicted state of the aircraft for a subsequent flight of the aircraft based on the flight data, including the apparatus being caused to at least:
      deploy a similarity detection model to determine similarities between the flight data for the flight and a training set of flight data for previous flights of the aircraft, the flight data for the previous flights assigned to conditions of the aircraft that are independent variables of a classification model built to predict a state of the aircraft for the subsequent flight, the similarities determined by the similarity detection model being values of the independent variables; and deploy the classification model to predict and thereby produce the predicted state of the aircraft for the subsequent flight of the aircraft based on the values of the independent variables;

generate an alert when the predicted state of the aircraft is a faulty state;

monitor a reporting system of the aircraft to determine if the aircraft reported a fault during the flight; and deploy the similarity detection model to determine if the flight data for the flight has a threshold similarity with the flight data for any of the previous flights that are assigned to the conditions of the aircraft.

2. The apparatus of claim 1, wherein the apparatus being caused to predict and thereby produce the predicted state of the aircraft for the subsequent flight includes being caused to predict and thereby produce the predicted state of the aircraft for the subsequent flight only when the aircraft did not report the fault during the flight.

3. The apparatus of claim 1, wherein the memory stores further executable instructions that, in response to execution by the processor and when the aircraft reported the fault during the flight, cause the apparatus to further at least:

when the flight data for the flight does not have the threshold similarity with the flight data for any of the previous flights, assign the flight data for the flight to a new condition of the aircraft indicating the faulty state; and add the flight data for the flight assigned to the new condition to the training set for the similarity detection model.

4. The apparatus of claim 1, wherein the memory stores further executable instructions that, in response to execution by the processor and when the aircraft reported the fault during the flight, cause the apparatus to further at least:

when the flight data for the flight has the threshold similarity with the flight data for a previous flight assigned to a condition of the conditions indicating the faulty state, assign the flight data for the flight to the condition; and add the flight data for the flight assigned to the condition to the training set for the similarity detection model.

5. The apparatus of claim 1, wherein the subsequent flight is of a plurality of flights after the flight, and the memory stores further executable instructions that, in response to execution by the processor, cause the apparatus to further at least:

monitor the flight data for the plurality of flights to determine if the aircraft reported the fault during the plurality of flights to verify the predicted state.

6. The apparatus of claim 1, wherein the apparatus being caused to deploy the similarity detection model includes being caused to deploy the similarity detection model to at least:

plot the flight data for the flight to produce one or more first images, and plot the training set of flight data to produce one or more second images; and compare the one or more first images with the one or more second images to determine the similarities between the flight data for the flight and the training set of flight data for the previous flights.

7. A method of maintenance of an aircraft, comprising:

accessing flight data for a flight of the aircraft, the flight data including measurements of one or more properties from one or more sensors or avionic systems during the flight;

predicting and thereby producing a predicted state of the aircraft for a subsequent flight of the aircraft based on the flight data, including at least:

deploying a similarity detection model to determine similarities between the flight data for the flight and a training set of flight data for previous flights of the aircraft, the flight data for the previous flights assigned to conditions of the aircraft that are independent variables of a classification model built to predict a state of the aircraft for the subsequent flight, the similarities determined by the similarity detection model being values of the independent variables; and deploying the classification model to predict and thereby produce the predicted state of the aircraft for the subsequent flight of the aircraft based on the values of the independent variables;

generating an alert when the predicted state of the aircraft is a faulty state;

monitoring a reporting system of the aircraft to determine if the aircraft reported a fault during the flight; and deploying the similarity detection model to determine if the flight data for the flight has a threshold similarity with the flight data for any of the previous flights that are assigned to the conditions of the aircraft.

8. The method of claim 7, wherein predicting and thereby producing the predicted state of the aircraft for the subsequent flight includes predicting and thereby producing the predicted state of the aircraft for the subsequent flight only when the aircraft did not report the fault during the flight.

9. The method of claim 7, further comprising:

when the flight data for the flight does not have the threshold similarity with the flight data for any of the previous flights, assigning the flight data for the flight to a new condition of the aircraft indicating the faulty state; and adding the flight data for the flight assigned to the new condition to the training set for the similarity detection model.

10. The method of claim 7, further comprising:

when the flight data for the flight has the threshold similarity with the flight data for a previous flight assigned to a condition of the conditions indicating the faulty state, assigning the flight data for the flight to the condition; and adding the flight data for the flight assigned to the condition to the training set for the similarity detection model.

11. The method of claim 7, wherein the subsequent flight is of a plurality of flights after the flight, and the method further comprising:

monitoring the flight data for the plurality of flights to determine if the aircraft reported the fault during the plurality of flights to verify the predicted state.

12. The method of claim 7, wherein deploying the similarity detection model includes deploying the similarity detection model to at least:

plot the flight data for the flight to produce one or more first images, and plot the training set of flight data to produce one or more second images; and compare the one or more first images with the one or more second images to determine the similarities between the flight data for the flight and the training set of flight data for the previous flights.

13. A computer-readable storage medium for maintenance of an aircraft, the computer-readable storage medium being non-transitory and having computer-readable program code stored therein that in response to execution by a processor, causes an apparatus to at least:

access flight data for a flight of the aircraft, the flight data including measurements of one or more properties from one or more sensors or avionic systems during the flight;

predict and thereby produce a predicted state of the aircraft for a subsequent flight of the aircraft based on the flight data, including the apparatus being caused to at least:

deploy a similarity detection model to determine similarities between the flight data for the flight and a training set of flight data for previous flights of the aircraft, the flight data for the previous flights assigned to conditions of the aircraft that are independent variables of a classification model built to predict a state of the aircraft for the subsequent flight, the similarities determined by the similarity detection model being values of the independent variables; and deploy the classification model to predict and thereby produce the predicted state of the aircraft for the subsequent flight of the aircraft based on the values of the independent variables;

generate an alert when the predicted state of the aircraft is a faulty state;

monitor a reporting system of the aircraft to determine if the aircraft reported a fault during the flight; and deploy the similarity detection model to determine if the flight data for the flight has a threshold similarity with the flight data for any of the previous flights that are assigned to the conditions of the aircraft.

14. The computer-readable storage medium of claim 13, wherein the apparatus being caused to predict and thereby produce the predicted state of the aircraft for the subsequent flight includes being caused to predict and thereby produce the predicted state of the aircraft for the subsequent flight only when the aircraft did not report the fault during the flight.

15. The computer-readable storage medium of claim 13, having further computer-readable program code stored therein that in response to execution by the processor, causes the apparatus to further at least:

when the flight data for the flight does not have the threshold similarity with the flight data for any of the previous flights, assign the flight data for the flight to a new condition of the aircraft indicating the faulty state; and add the flight data for the flight assigned to the new condition to the training set for the similarity detection model.

16. The computer-readable storage medium of claim 13, having further computer-readable program code stored therein that in response to execution by the processor, causes the apparatus to further at least:

when the flight data for the flight has the threshold similarity with the flight data for a previous flight assigned to a condition of the conditions indicating the faulty state, assign the flight data for the flight to the condition; and add the flight data for the flight assigned to the condition to the training set for the similarity detection model.

17. The computer-readable storage medium of claim 13, wherein the subsequent flight is of a plurality of flights after the flight, and the computer-readable storage medium having further computer-readable program code stored therein that in response to execution by the processor, cause the apparatus to further at least:

monitor the flight data for the plurality of flights to determine if the aircraft reported the fault during the plurality of flights to verify the predicted state.

18. The computer-readable storage medium of claim 13, wherein the apparatus being caused to deploy the similarity detection model includes being caused to deploy the similarity detection model to at least:

plot the flight data for the flight to produce one or more first images, and plot the training set of flight data to produce one or more second images; and compare the one or more first images with the one or more second images to determine the similarities between the flight data for the flight and the training set of flight data for the previous flights.

* * * * *